(12) United States Patent
Vigneras et al.

(10) Patent No.: US 9,298,520 B2
(45) Date of Patent: Mar. 29, 2016

(54) GENERATING A SEQUENCE OF INSTRUCTIONS ON THE BASIS OF A DEPENDENCY CHART GENERATED THROUGH APPLICATION OF AT LEAST ONE DEPENDENCY RULE

(75) Inventors: Pierre Vigneras, Angervilliers (FR); Marc Girard, Antony (FR)

(73) Assignee: BULL SAS, Les Clayes Sous Bois (FR)

( * ) Notice: Subject to any disclaimer, the term of this patent is extended or adjusted under 35 U.S.C. 154(b) by 229 days.

(21) Appl. No.: 14/111,522

(22) PCT Filed: Mar. 22, 2012

(86) PCT No.: PCT/FR2012/050598
§ 371 (c)(1),
(2), (4) Date: Oct. 31, 2013

(87) PCT Pub. No.: WO2012/140344
PCT Pub. Date: Oct. 18, 2012

(65) Prior Publication Data
US 2014/0059564 A1 Feb. 27, 2014

(30) Foreign Application Priority Data

Apr. 11, 2011 (FR) .................................... 11 53122

(51) Int. Cl.
*G06F 9/46* (2006.01)
*G06F 9/54* (2006.01)
*G06F 11/30* (2006.01)
*H04L 12/24* (2006.01)

(52) U.S. Cl.
CPC .............. *G06F 9/54* (2013.01); *G06F 11/3006* (2013.01); *G06F 11/3051* (2013.01); *H04L 41/0893* (2013.01); *H04L 41/12* (2013.01); *Y04S 40/162* (2013.01); *Y04S 40/164* (2013.01)

(58) Field of Classification Search
None
See application file for complete search history.

(56) References Cited

U.S. PATENT DOCUMENTS

2006/0190768 A1 8/2006 Kawase
2009/0165002 A1* 6/2009 Sterbenz ....................... 718/102

OTHER PUBLICATIONS

PCT, International Search Report for International Application No. PCT/FR2012/050598, dated Aug. 8, 2012.
Written Opinion of the International Searching Authority as issued in International Application No. PCT/FR2012/050598, dated Oct. 15, 2013.

* cited by examiner

*Primary Examiner* — Wissam Rashid
(74) *Attorney, Agent, or Firm* — Pillsbury Winthrop Shaw Pittman LLP

(57) ABSTRACT

The disclosure relates in particular to the processing of commands targeting at least one element of a cluster including a plurality of elements, the at least one element having a link of dependency according to the at least one command with at least one other element. After having identified the at least one element and at least one dependency rule from the at least one command, a dependency graph is generated from the at least one identified element, by applying the at least one identified dependency rule, the dependency graph including peaks representing at least the element and the at least one other element, an action linked with the at least one command being associated with the peaks of the dependency graph. A sequence of instructions is then generated from the dependency graph.

13 Claims, 6 Drawing Sheets

Fig. 6a  | nfs1#nfsd@soft | cd0#colddoor@hw | nfs2#nfs@node |

GENERATING A SEQUENCE OF INSTRUCTIONS ON THE BASIS OF A DEPENDENCY CHART GENERATED THROUGH APPLICATION OF AT LEAST ONE DEPENDENCY RULE

RELATED APPLICATIONS

This application is a U.S. National Phase under 35 U.S.C. §371 of International Application No. PCT/FR2012/050598, which designated the U.S., filed Mar. 22, 2012 and which claims priority under 35 U.S.C. §119 to France Patent Application No. FR20110053122, filed Nov. 4, 2012. The disclosures of the above-described applications are hereby expressly incorporated by reference in their entireties.

BACKGROUND

1. Field

The present disclosure concerns the administration of complex computer systems and more particularly a method and a device for processing administration commands in a cluster.

2. Description of the Related Art

HPC (standing for High Performance Computing) is being developed for university research and industry alike, in particular in technical fields such as aeronautics, energy, climatology and life sciences. Modeling and simulation make it possible in particular to reduce development costs and to accelerate the placing on the market of innovative products that are more reliable and consume less energy. For research workers, high performance computing has become an indispensable means of investigation.

This computing is generally conducted on data processing systems called clusters. A cluster typically comprises a set of interconnected nodes. Certain nodes are used to perform computing tasks (compute nodes), others to store data (storage nodes) and one or more others manage the cluster (administration nodes). Each node is for example a server implementing an operating system such as Linux (Linux is a trademark). The connection between the nodes is, for example, made using Ethernet or Infiniband communication links (e.g., Ethernet and Infiniband are trademarks). Each node generally comprises one or more microprocessors, local memories and a communication interface.

FIG. 1 is a diagrammatic illustration of an example of a topology 100 for a cluster, of fat-tree type. The latter comprises a set of nodes of general reference 105. The nodes belonging to the set 110 are compute nodes here whereas the nodes of the set 115 are service nodes (storage nodes and administration nodes). The compute nodes may be grouped together in sub-sets 120 referred to herein as "compute islets," the set 115 being referred to herein as a service islet.

The nodes are linked together by switches, for example hierarchically. In the exemplary embodiment illustrated in FIG. 1, the nodes are connected to first level switches 125 which are themselves linked to second level switches 130 which in turn are linked to third level switches 135.

The nodes of a cluster as well as the other components such as the switches are often grouped together in racks, which may themselves be grouped together into islets. Furthermore, to ensure proper operation of the components contained in a rack, the rack generally comprises a cooling system, for example a cooling door (often called a cold door).

The management of a cluster, in particular the starting, stopping or the software update of components in the cluster, is typically carried out from administration nodes using predetermined processes or directly by an operator. Certain operations such as starting and stopping of the whole of the cluster, islets or racks, may also be carried out manually, by node or by rack.

It has been observed that although the problems linked to the management of clusters do not generally have a direct influence on the performance of a cluster, they may be critical. Thus, for example, if a cooling problem for a room housing racks is detected, it is often necessary to rapidly stop the cluster at least partially to avoid overheating of components which could in particular lead to the deterioration of hardware and/or data loss.

There is thus a need to improve the management of clusters, in particular to process administration commands.

SUMMARY

The disclosure enables at least one of the problems set forth above to be solved.

The disclosure thus relates to a computer method for processing at least one command concerning at least one component of a cluster, the cluster comprising a plurality of components, the at least one component having a dependency link according to the at least one command with at least one other component of the plurality of components, the method comprising, identifying the at least one component of the plurality of components;

identifying at least one dependency rule on the basis of the at least one command;

generating a dependency chart on the basis of the at least one identified component, through application of the at least one dependency rule identified, the dependency chart comprising vertices representing at least one the component and the at least one other component, an action linked to the at least one command being associated with the vertices of the dependency chart; and, generating a sequence of instructions on the basis of the dependency chart.

The method according to the disclosure thus makes it possible to generate, from a command and identifiers of components of a cluster, a sequence of instructions satisfying constraints relating to actions concerning components of that cluster. The method according to the disclosure enables commands to be processed in a heterogeneous cluster, capable of modification, facilitating the administration of the cluster, in particular by reducing the number and the names of commands.

Advantageously, an identification function for identifying components and a dependency rule are associated with the at least one identified dependency rule, the method further comprising identifying at least the other component from the identification function, the dependency chart being generated from the at least one identified component, from the at least one other component, from the at least one identified dependency rule and from the dependency rule associated with the at least one identified dependency rule. The method according to the disclosure thus enables the set of components involved in the execution of the processed command to be determined recursively, according to different levels of granularity of the components (hardware or software).

According to an embodiment, the method further comprises displaying information relative to the dependency chart, and generating the sequence of instructions being carried out in response to a validation of the information displayed relative to the dependency chart. Thus, in accordance with the method, a user can view the dependency chart in order, in particular, to validate it, modify it or modify the dependency rules to regenerate, if required, a new dependency chart.

Still according to an embodiment, generating a dependency chart is recursive and comprises:
creating an initial dependency chart comprising at least the at least one component;
selecting a component in the dependency chart
identifying at least one component on which the selected component is dependent in view of a dependency rule; and,
modifying the dependency chart according to the selected component and the at least one identified component on which the selected component is dependent in view of a dependency rule.

The method according to an embodiment thus makes it possible to simply and effectively construct a dependency chart from which can be generated a sequence of instructions satisfying constraints relating to actions concerning components of that cluster for processing a command.

Advantageously, the step of selecting a component in the dependency chart is based on a rule chart, the rule chart being an ordered representation of the at least one identified dependency rule and dependency rules directly or indirectly associated with the at least one identified dependency rule.

The method according to an embodiment thus makes it possible to simply and efficiently find an order for executing actions on components of a cluster according to predetermined constraints.

According to an embodiment, the step of generating a sequence of instructions comprises generating at least one group of instructions for each level of the dependency chart. The method thus enables intelligent management of faults to avoid the loss of data and harm to equipment while executing to the greatest extent possible the instructions defined according to the command concerned.

Still according to an embodiment, the sequence of instructions is generated in the form of a file of XML type, a level tag being associated with each level of the dependency chart and a group tag being associated with each group of instructions for each tag of level corresponding to a level for which there are at least two distinct groups of instructions. The method thus provides easy reading of the sequences of instructions linked to a command which may thus be verified and/or modified simply while limiting the risks of errors for a user.

Still according to an embodiment, the method further comprises executing the sequence of instructions.

Still according to an embodiment, the method further comprises displaying information relative to the sequence of instructions, the step of executing the sequence of instructions being carried out in response to a validation of the information displayed relative to the sequence of instructions. Thus, in accordance with the method, a user may view the sequence of instructions in order, in particular, to validate it, modify it or modify dependency rules or the dependency chart that is used to regenerate, if required, a new sequence of instructions.

Advantageously, instructions relative to two distinct levels of the dependency chart are executed sequentially and according to which chart, instructions of distinct groups of instructions of the same level of the dependency chart are executed in parallel. The method furthermore makes it possible to perform actions in parallel concerning several sets of components in order, in certain embodiments, to optimize the execution time of a command.

An embodiment of the disclosure is also directed to a computer program comprising instructions adapted to the implementation of each of the steps of the method described earlier when the program is executed on a computer as well as to a device comprising means adapted to the implementation of each of the steps of the method described earlier. The advantages procured by that computer program and that device are similar to those referred to above.

BRIEF DESCRIPTION OF THE DRAWINGS

Other advantages and features of the present disclosure will emerge from the following detailed description, given by way of non-limiting example, relative to the accompanying drawings in which:

FIG. 6, comprising FIGS. 6a to 6f, are diagrams illustrating the implementation of the algorithm described with reference to FIG. 5 according to the example described with reference to FIGS. 3 and 4.

DETAILED DESCRIPTION OF CERTAIN INVENTIVE EMBODIMENTS

The disclosure in particular relates to the generation of sequences of instructions enabling the execution of administration commands for clusters. Such commands are, for example, the stopping or the starting of a cluster or of part of a cluster such as racks or islets (set of racks). The disclosure makes it possible to limit the execution time of these commands and facilitate the maintenance of clusters, while taking into account the specificities of each item of equipment.

The method according to an embodiment comprises three phases, generating a dependency chart, generating a sequence of instructions and executing that sequence of instructions. A dependency chart may be obtained here on the basis of dependency rules, a list of components of the cluster to which the administration command is to be applied, and also on the basis of the configuration of those components. This chart may, for example, indicate that a cold door of a given rack can only be stopped after the servers contained in that rack have been stopped.

The sequence of instructions generated is in accordance with the dependency constraints expressed in the dependency chart. Thus, by way of illustration, that sequence may indicate that certain nodes may be stopped in parallel whereas certain nodes and a certain cold door must be stopped sequentially. It is advantageously optimized according to the instructions that may be executed in parallel. Lastly, the execution of that sequence of instructions may take errors into account. Thus, for example, if a server has not been correctly stopped in software terms, the Power Distribution Unit (or PDU) upon which it depends should not be turned off.

Figure 1:
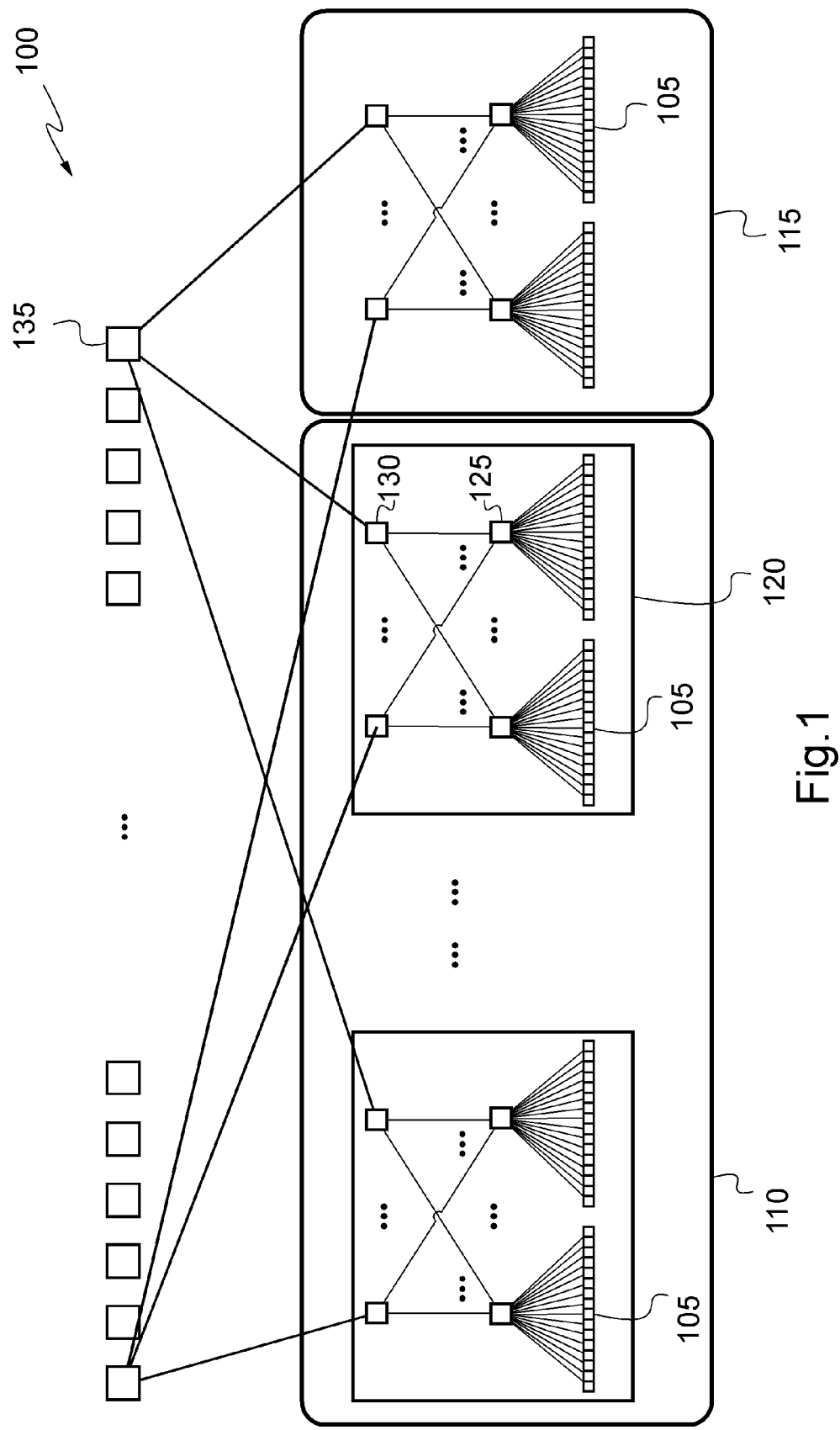
FIG. 1 is a diagram illustrating an example of topology for a cluster.
Figure 2:
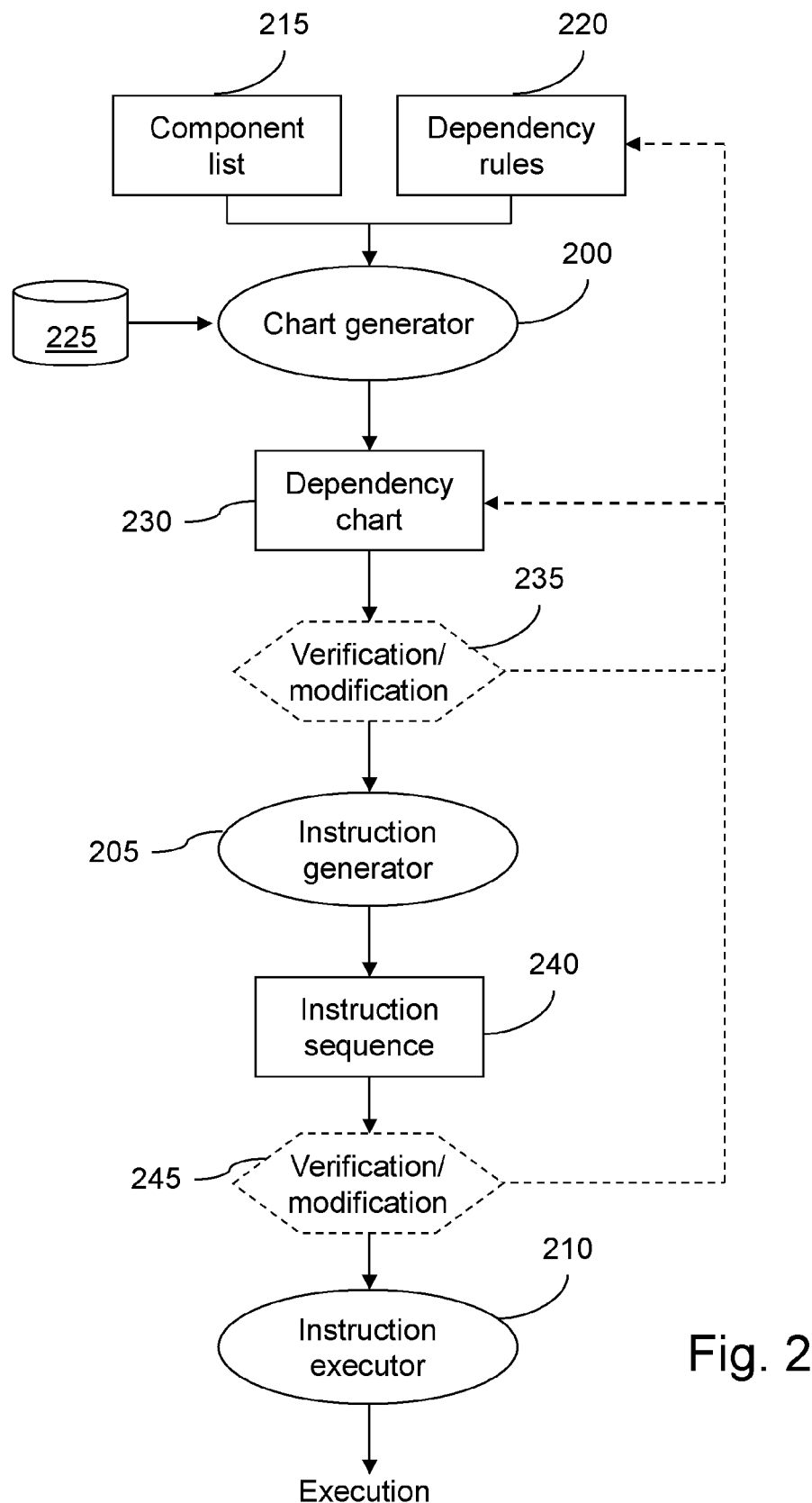
FIG. 2 is a diagram illustrating an example of implementation of certain phases of the method according to the disclosure.

FIG. 2 represents an exemplary implementation of those three phases, implemented in a dependency chart generator 200, an instruction generator 205 and an instruction executor 210, respectively.

The dependency chart generator 200 here relies on the use of a list of components, referenced 215, dependency rules referenced 220, and data 225 characterizing the components and the links joining them together. It enables a dependency chart 230 to be obtained from which may be generated sequences of instructions.

In an embodiment, the dependency chart is advantageously obtained using, in particular, a rule chart, characterizing the dependency links between the rules of the same set of dependency rules, which makes it possible to identify the roots that may be used to determine an order of application of actions to components, as described below.

The dependency chart 230 may be verified by a user (step 235) who may validate it, modify it or modify or add dependency rules to re-generate a new dependency chart.

The dependency chart 230 may be used by the instructions generator 205 to generate a sequence of instructions 240 making it possible to carry out the administration command concerning the components determined according to dependency rules identified according to that command.

The sequence of instructions 240 may be verified by a user (step 245) who may validate it, modify it, modify the dependency chart 230 or modify or add dependency rules to regenerate a new dependency chart and re-generate a new sequence of instructions.

The sequence of instructions 240 may then be executed by the instructions generator 210. A sequence of instructions may be generated when an administration command concerning a set of determined components must be executed or generated in anticipation to enable its execution when a command concerning a set of specific components must be executed without it being necessary to generate the corresponding sequence of instructions (the sequence of instructions may thus be executed immediately).

It is observed here that if the algorithm described with reference to FIG. 2 enables a user to verify each phase, the phases of dependency chart generation, generating sequences of instructions and executing those sequences may be executed one after the other, in a way which is transparent for the user.

The list of components 215 identifies the set of components processed by an administration command. By way of illustration, this list may be expressed by a set of expressions of the following form:

componentNamePrefix[a-b, c-d, . . . ] #type @ category
where
componentNamePrefix[a-b, c-d, . . . ] is a contracted standard notation to designate a set of component names having the prefix componentNamePrefix and a suffix equal to a value taken in the ranges [a-b], [c-d], etc.;
type is a description of the component considered. Thus, for example, if the component considered is a node, the type may be equal to compute to indicate that it is a compute node. These types of components are described in more detail below; and
category is the category of the component considered relative to the categories defined in a database defining the components of a cluster (generally called cluster database or clusterDB). By way of illustration, the categories defined in the clusterDB used are for example the following,
hwmanager or hw (this category designates controllers of hardware components, in particular of BMC type (BMC standing for Baseboard Management Controller);
disk-array or da (this category typically designates storage bays);
switch (this category typically designates switches, for example switches of Ethernet, Infiniband or PDU type);
node (this category typically designates nodes, for example compute, input/output or administration nodes);
hw_group and rack (these categories designate sets of hardware components); and,
soft (this category designates all the software components of the cluster, for example a server of nfs type, nfs standing for Network File System).

The components of another embodiment of the cluster may be defined differently, as required.

In an embodiment, it may be observed that if the type@category part is missing, it may generally be recovered, for example from the clusterDB, an error being generated if the component considered is not recovered. However, to avoid frequently interrogating the clusterDB, which may be detrimental in terms of processing time, it is preferable to specify that parameter in the list of the components.

An example of a list of components is given in Appendix A1. According to that example, the first expression concerns components named Calcul_1, Calcul_2 and Calcul_3, corresponding to islets (islet) and defined in the clusterDB by the category hw_group. Similarly, the fourth expression concerns a set of nine nodes named bullx12 to bullx20 which are here compute nodes (#compute@node).

In an embodiment, the dependency rules 220 are the dependency rules to be applied to the components concerned by the list of components 215. They enable actions to be associated with components of a cluster and to identify dependencies between components of a cluster according to the required actions. The dependency rules 220, identified by the same name or the same administration command identifier, form a RuleSet, that is to say a set of rules potentially to be applied (according to the components concerned) to execute a called administration command.

It is observed here that if an administration command directly concerns a set of dependency rules, it may also indirectly concern other dependency rules which are themselves linked directly or indirectly to the dependency rules directly concerned by the administration command.

An exemplary embodiment of dependency rules is illustrated in Appendix A2. These dependency rules may be represented here in the form of a table in which each row corresponds to a dependency rule. As indicated earlier, an administration command here corresponds to an initial selection of dependency rules. Thus, for example, the administration command called "stop" uses several dependency rules capable of applying to components of different types.

The columns of that table are defined here in the following way:
RuleSet: name of the administration command calling the dependency rule which is the subject of the row considered;
Symbolic name: unique symbolic name of the dependency rule which is the subject of the row considered;
Comp. type: type of the component to which applies the dependency rule. The syntax used here is similar to that described above, in the form type@category. Several types of components may be concerned by a dependency rule. In such case, those types are separated by a logical symbol, for example "OR" or "|". Certain expressions such as "all" may be used to designate several types without it being necessary to define them one by one. The categories are, for example, those defined earlier (hwmanager or hw, disk-array, switch, node, hw_group, rack and soft), the types of components may be, for example, the following, compute, login, io and mngt to characterize a function such that, for example, compute@node designates a compute node, login@node designates a connection node, io@node designates an input/output node and mngt@node designates an administration node;

all designates all the types of a given category, for example all@disk_array designates all the storage bays;

colddoor concerns the cold doors. As a cold door is a hardware component, it is designated by colddoor@hwmanager;

eth, ib and pdu concern types of switches for example such as eth@switch which designates an Ethernet switch, ib@switch which designates an Infiniband switch and pdu@switch which designates a PDU switch; and nfsd, sshd and lustre designate software components for example such as nfsd@soft which designates an NFS daemon, sshd@soft which designates an SSH server and lustre@soft which designates a lustre daemon (lustre is a trademark here designating a distributed file system).

Filter: a filter having an expression in the form "% var=~regexp" or "% var!~regexp", used to select the components to which the action linked to the dependency rule is to be applied (the application of a filter is described below);

Action: an action to be executed for the selected components (the expression "% comp." is replaced by the name of the component considered). As described below, according to the value of the return code for the action, after its execution, the generator of the dependency chart may, according to the chosen execution mode, indicate an error and stop or continue the execution of instructions;

DepsFinder: name of a script to call which, for the given components (defined by Comp. type and Filter), returns a list of pairs (x, t) where x represents the name of a component which may be processed, typically stopped or started, before the given components or the components corresponding to the given type of components and in which t represents the type of that component. This type may be one of the types described above. A particular expression, "none", may be used when there is no dependency. This particular expression indicates that the component or components considered do not depend on other components (for the processing of the administration command concerned);

DependsOn: is a list of symbolic names of dependency rules (included in the Symbolic name column) making references to other components or component types identified by the field DepsFinder. A particular expression, "none", is used when there is no dependency. This expression is ignored if the expression "DepsFinder" is "none". The dependency rules concerned here belong to the set of dependency rules concerned by the administration command considered; and, Comments: comments without incidence on the dependency rule.

It is observed here that the set of the dependency rules may, for example be stored in the clusterDB.

As indicated earlier, the application of a dependency rule may comprise filtering with a filter that may, for example, be expressed in the form "% var=~regexp" or "% var !~regexp" where % var is replaced by its value during the evaluation of the expression (for example % id, % ruleset and % comp.), the operator=~indicates that the component (% comp.) is only filtered if the expression is verified whereas the operator !~ indicates that the component is only filtered if the expression is not verified.i If the expression does not begin with a known variable "% var", the expression is interpreted as a command of shell type which, when called, specifies whether the given component may be kept (return code equal to zero) or rejected (return code different from zero). Two particular expressions "all" and "null" are reserved to accept all the components and to reject them, respectively. By way of illustration, to accept all the components of which the name contains "bullx104", the expression "% name=~bullx104" may be used.

By way of illustration, the second dependency rule given in Appendix A2, called "nodeOn", concerns a command (RuleSet) for starting (start) for components of compute node type (compute@node). In an embodiment, a filter is used to select only the compute nodes not containing the name compute12 (% name !~compute12). The dependency rule nodeOn uses the function nodectrl with the parameters poweron and % comp. the object of which is to start the selected compute nodes. The dependency rule nodeOn uses the script find_nodeon_deps to identify nodes must be processed (here started) before each compute node considered. Furthermore, it may be specified that the execution of the dependency rule nodeon depends on the execution of the dependency rule ColddoorStart concerning the starting of a cold door. In other words, a selected compute node can only be started if the cold door of the rack in which it is located has been started beforehand. The dependency rule ColddoorStart applies to the components yielded by the script DepsFinder corresponding to the dependency rule nodeOn.

Similarly, the third dependency rule given in Appendix A2, called "colddoorOff", concerns a command (RuleSet) for stopping (stop) for hardware components of cold door type (colddoor@hw). No filter is used here. Consequently, all the cold doors are concerned by this dependency rule. The latter uses the function bsm_power with the parameters off % comp. the object of which is to stop a cold door. The dependency rule colddoorOff uses the script find_colddoorOff_dep to identify all the nodes which are to be processed (here stopped) before the cold door considered. Furthermore, it is specified that the execution of the dependency rule colddoorOff depends on the dependency rule nodeOff concerning the stopping of nodes. In other words, a cold door can only be stopped if the nodes linked to the cold door have been stopped in advance. However, if a node cannot be stopped, it is nevertheless possible to stop the cold doors of the racks not including any node.

In an embodiment, when a command (RuleSet) is called to process a set of components, all the dependency rules corresponding to that command are selected as well as, where appropriate, the dependency rules linked on account of the dependencies, directly or indirectly, to those initially selected rules. Among these selected rules, some, linked to components of the list of components, are implemented and others, linked directly or indirectly to implementation rules, are also implemented. Certain selected rules may thus not be implemented.

Thus, according to the example given in Appendix A2, if the command start is called, all the dependency rules corresponding to that command, including the dependency rule nodeOn, are selected. It is observed that among these selected rules, the dependency rule ColddoorStart (not represented) is implemented if the dependency rule nodeOn is implemented on account of the dependency.

After having identified an initial set of components (list of components) a set of dependency rules and a set of components that may influence the components of the initial set of components, it is possible to generate a rule chart which may be used for generating a dependency chart. Such a step is carried out here in the chart generator.

The rule chart is created from all the dependency rules identified and implemented, according to the dependency relationships identified here in the field DependsOn.

The rule chart makes it possible, by iteration, to construct a dependency chart between all the identified components.

Figure 3:
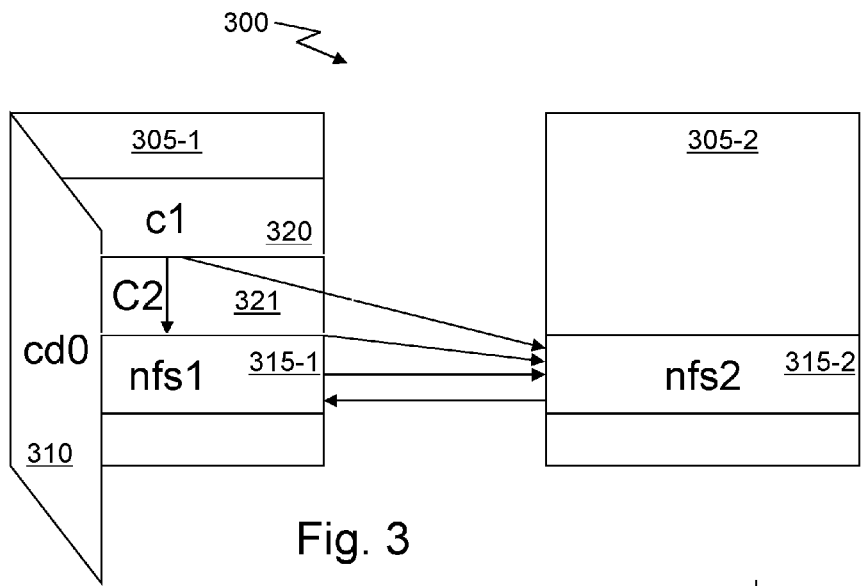
FIG. 3 is a diagram representing an example of dependency relationships between components of a cluster.

In an embodiment, a cluster (particularly simplified) is considered here comprising several components linked to each other by dependency relationships some of which are illustrated in FIG. 3. The cluster 300 comprises two racks 305-1 and 305-2. The rack 305-1, cooled by a cold door 310 (called cd0), comprises a server 315-1 of NFS type (called nfs1) and a compute node 320 (called c1) whereas the rack 305-2 comprises a server 315-2 of NFS type (called nfs2). It is assumed that the server nfs1 is a client of the server nfs2, that, reciprocally, the server nfs2 is a client of the server nfs1 and that the compute node c1 is a client of the servers nfs1 and nfs2.

The object here is to stop (administration command stop) the NFS daemon of the server nfs1 (component nfs1#nfsd@soft in the list of components concerned by the administration command considered), to turn off the cold door cd0 (component cd0#colddoor@hw in the list of components concerned by the administration command considered), and stop the server nfs2 (component nfs2#nfs@node in the list of components concerned by the administration command considered).

Figure 4:
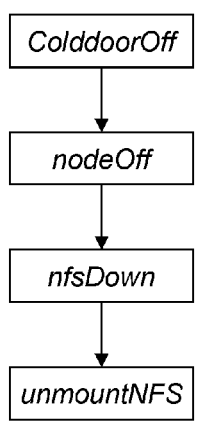
FIG. 4 is a diagram illustrating a rule chart example.

The constraints are to turn off the compute node c1 (nodeOff) before the cold door cd0 (colddoorOff), to stop the NFS daemons (nfsDown) on the servers nfs1 and nfs2, to display a warning (unmountNFS) for each client of the NFS servers (in order to warn of the stopping of the NFS servers) and to stop the server nfs2 (nodeOff). These constraints may be expressed in rule chart form as illustrated in FIG. 4. As indicated earlier, the order of the dependency rules may be determined according to the indications associated with each of them, for example the indications of the field DependsOn described earlier.

Figure 5:
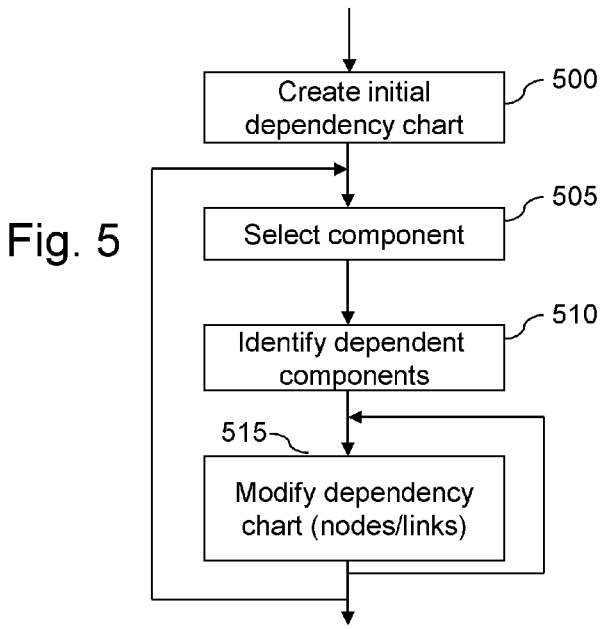
FIG. 5 is a flowchart illustrating certain steps of an example of a recursive algorithm used to generate a dependency chart in accordance with the disclosure.

FIG. 5 illustrates certain steps of an example of a recursive algorithm used to generate a dependency chart in accordance with the disclosure. A first step (step 500) is directed to creating an initial dependency chart. The latter may comprises all the components of the list of components (referenced 215 in FIG. 2) concerned by the administration command considered.

A following step (step 505) consists of selecting a component in the dependency chart in course of construction. In an embodiment, the component selected is chosen on the basis of the rule chart, as being the first component of a root of the rule chart (in which roots may possibly have been deleted virtually during the construction of the dependency chart). If no component corresponds to a root of the rule chart, those roots are deleted (virtually) and the step is repeated with the resulting rule chart.

The components dependent on the selected component are then identified (step 510). As described above, these components may be identified using dependency rules which are associated with them and scripts of the field DepsFinder.

These components are added to the dependency chart in course of construction then dependency links between the components of the dependency chart are added (step 515). The added components are in turn processed (according to the dependency rules defined in the field DependOn which is associated with the field DepsFinder that led to the identification of those components) to determine whether they depend on other components. Step 515 is thus executed recursively. If a component does not depend on other components, the action associated with it (defined in the field action of the dependency rule) is stored in memory and the following component (going up in the hierarchy of the dependency chart) is processed to determine whether all the components on which it depends have been processed and, the case arising, to store the associated action in memory.

When all the components identified and added to the dependency chart have been processed, another component of the dependency chart, not yet processed, is, the case arising, selected (step 505). As indicated previously, if no component is associated with a root of the rule chart, those roots are deleted (virtually) and the step is repeated with the resulting rule chart.

The algorithm terminates when all the components associated with the rule chart (and the components which depend thereon) have been processed.

Thus, a dependency chart may be created here from the components present in the list of components by adding dependent components on the basis of dependency rules, by adding dependency links and by modifying the nodes of the chart to add actions according to the dependency rules concerned. In other words, when a component is processed via a dependency rule, the script DepsFinder is called. The components determined by that script, upon which an action must be performed before performing the action concerning the processed component, not appearing in the dependency chart, are added to it. All the components to be processed (components of the list of components and components upon which those components depend) form a set of components to process. When a component is processed, it is removed from that set. The process of generating the dependency chart terminates when that set is empty.

The algorithm described with reference to FIG. 5 is now illustrated, with reference to FIGS. 6a to 6f according to the example illustrated in FIGS. 3 and 4.

In an embodiment, the first step of the algorithm for constructing the dependency chart consists of creating a chart comprising the components specified in the list of components to which must be applied the administration command concerned, that is to say, according to the example described with reference to FIG. 3, the daemon nfs1 (nfs1#nfsd@soft), the cold door cd0 (cd0#colddoor@hw) and the server nfs2 (nfs2·nfs@node), as represented in FIG. 6a.

As represented in FIG. 4, the rule chart linked to that example only comprises one root concerning the rule for stopping a cold door (colddoorOff). This rule is associated here with the cold door cd0. This component is thus selected as first component in accordance with step 505.

Figure 6B:
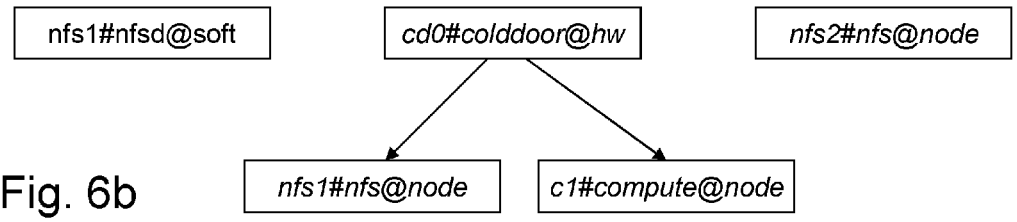

The script DepsFinder linked to the stopping of the cold door cd0 makes it possible to identify the compute server c1 (c1#compute@node) as well as the server nfs1 (nfs1#nfs@node). These components are then added to the dependency chart with the corresponding dependency links, as illustrated in FIG. 6b.

Figure 6C:
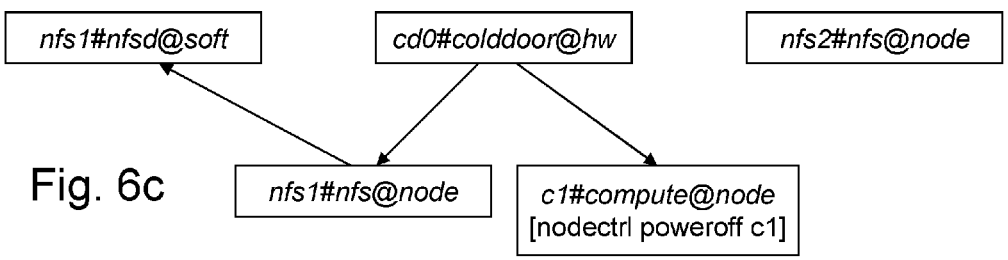

In an embodiment, the node c1 is then selected as well as the dependency rule nodeOff (linked to the rule for stopping the cold door cd0). The corresponding script DepsFinder returns nothing (the stopping of the node does not depend here on another component). The action of the rule associated with node c1 is stored (as illustrated in FIG. 6c). This action concerns a function for controlling a node (nodectrl) having as parameters poweroff in order to specify the type of control to perform (stopping a node) and c1 to identify the node concerned by the action.

In similar manner, node nfs1 is processed. Again, the dependency rule nodeOff (linked to the rule for stopping the cold door cd0) applies here. The corresponding script DepsFinder identifies the associated NFS daemon (nfs1#nfsd@soft). This component is then added to the dependency chart with the corresponding dependency link (as illustrated in FIG. 6c).

Figure 6D:
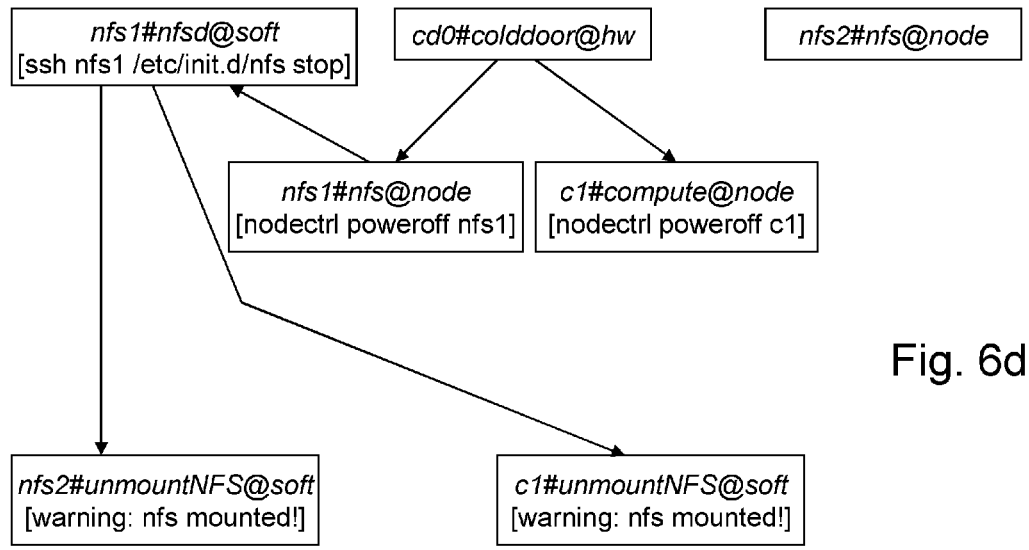

In recursive manner, the component nfs1#nfsd@soft is processed. Two new components (NFS clients linked to the nodes c1 and nfs2) are then created (c1#unmountNFS@soft and nfs2#unmountNFS@soft) in the dependency chart with the corresponding dependency links. As these new components have no dependency, the associated actions are stored in memory, then those of the component nfs1#nfsd@soft and lastly those of the component nfs1#nfs@node, as illustrated in FIG. 6d.

In a following iteration, the action associated with the cold door is stored.

In the list of exemplary components, comprising the daemon nisi (nfs1#nfsd@soft), the cold door cd0 (cd0#colddoor@hw) and the server nfs2 (nfs2#nfs@node), only the cold door cd0 has been processed. However, when processing the cold door cd0, the daemon nfs1 was processed incidentally. Consequently, only the server nfs2 (nfs2#nfs@node) remains to be processed. Again, the first component associated with a root of the rule chart (represented in FIG. 4) is sought. As no component is associated with the root ColddoorOff (the cold door cd0 has already been processed and there is no other component), that root is removed (virtually) from the rule chart. In the resulting rule chart, it is the rule nodeOff which is the root. The server nfs2, corresponding to the rule nodeOff, is thus selected.

Figure 6E:
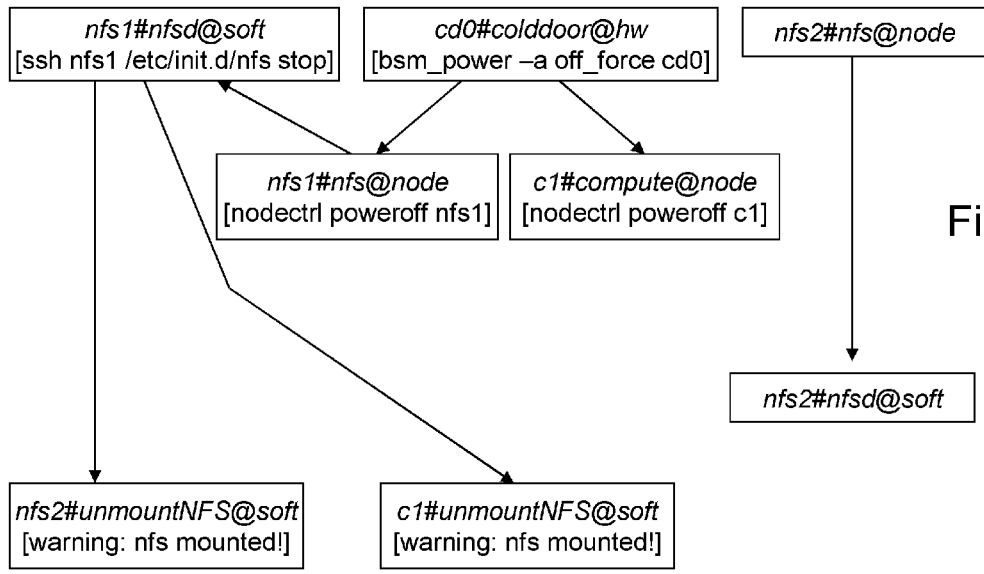

The script DepsFinder associated with the server nfs2 according to the rule nodeOff makes it possible to identify the daemon nfs2 (nfs2@nfsd@soft). This component is thus added to the dependency chart with the corresponding dependency link, as illustrated in FIG. 6e.

The daemon nfs2 is then selected to determine its dependencies, here c1#unmountNFS@soft and nfs1#unmountNFS@soft. As the component c1#unmountNFS@soft has already been added to the dependency chart, only the component nfs1#unmountNFS@soft is added to that chart, a dependency link being added to each of those components. In recursive manner, it is determined that those components have no dependency. The actions associated with those components are then stored.

In an embodiment, the same action cannot be stored twice for the same node. However, different actions, coming from different dependency rules, may be associated with the same node of the dependency chart. In other words, a given dependency rule can only be applied once to a given component whereas several distinct dependency rules may be applied to the same component which may lead to the association of several actions with the same node of the dependency chart.

Figure 6F:
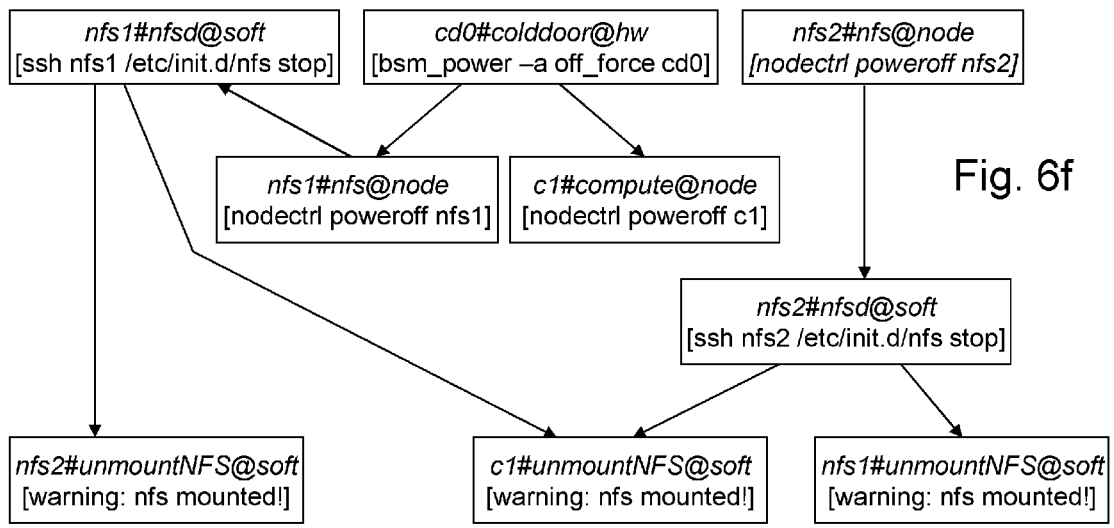

By moving up in the structure of the dependency chart, it may then possible to associate the actions with the components dependent on the components processed previously as illustrated in FIG. 6f which represents the dependency chart on the basis of which a sequence of instructions may be generated.

It is observed here that, if a cycle is observed in the dependency chart, the process may be terminated and the problem may be indicated to the user.

Several algorithms may be used to generate a sequence of instructions on the basis of a dependency chart. However, whatever the algorithm used, a sequence of instructions is advantageously represented in the form of a file of XML type (XML standing for eXtensible Markup Language), to be easily readable and modifiable by a user.

According to a first embodiment, a sequence of instructions is obtained on the basis of a dependency chart using a standard topological sorting algorithm. The sequence of instructions obtained corresponds to a trivial path through the chart, ensuring the constraints are complied with. However, although such an algorithm may be easy to implement and complies with the determined constraints, it does not enable parallel execution of certain instructions. Furthermore, if an instruction cannot be executed (for example further to an execution error), it is possible, according to the execution mode chosen, for the following instructions not to be executed, even if they do not depend on the instruction that cannot be executed.

According to another embodiment, the instructions are organized in such a manner as to be executed in parallel. The instructions the execution of which depends on the execution of other instructions are placed on standby until the execution of the latter. As soon as an instruction or a set of instructions is executed, those dependent thereon are executed. Such an embodiment gives good performance. However, the representation of the sequences of instructions so generated is difficult to understand, and therefore to modify, for a user.

Another embodiment is directed to combining the parallel and sequential approaches described earlier, that is to say, for example, to execute instructions in parallel by level. For such purposes, the vertices of the dependency chart representing leaves are identified. In the example described with reference to FIG. 6, these vertices correspond to the following components, c1#unmountNFS@soft [warning: nfs mounted!];
nfs1#unmountNFS@soft [warning: nfs mounted!];
nfs2#unmountNFS@soft [warning: nfs mounted!]; and,
c1#compute@node [nodectrl poweroff c1].

The instructions associated with those vertices then form a first set of instructions which may be executed in parallel, per group (each group corresponding to a vertex).

The vertices so identified are then removed (virtually) from the dependency chart and the vertices of the resulting dependency chart representing leaves are identified. In the example considered, these vertices correspond to the following components, nfs1#nfsd@soft [ssh nfs1/etc/init.d/nfs step]; and
nfs2#nfsd@soft [ssh nfs2/etc/init.d/nfs step].

The instructions associated with those vertices then form a second set of instructions which may be executed in parallel, per group (each group corresponding to a vertex), after the first set of instructions has been executed.

Again, the vertices identified are removed (virtually) from the dependency chart and the vertices of the resulting dependency chart representing leaves are identified. In the example considered, these vertices correspond to the following components, nfs1#nfs@node [nodectrl poweroff nfs1]; and,
nfs2#nfs@node [nodectrl poweroff nfs2].

The instructions associated with those vertices may then form a third set of instructions which may be executed in parallel, per group (each group corresponding to a vertex), after the first and second sets of instructions have been executed.

Again, the vertices identified are removed (virtually) from the dependency chart and the vertices of the resulting dependency chart representing leaves are identified. The instructions associated with the sole remaining vertex (cd0#colddoor@hw [bsm_power—a off_force cd0]) then form a fourth set of instructions which may be executed in parallel, after the first, second and third sets of instructions have been executed.

Appendix A3 illustrates an example of an XML file corresponding to such an embodiment. The tag <seq> indicates a section of groups of instructions to be processed sequentially whereas the tag <par> indicates sections of groups of instructions to be processed in parallel. Thus, for example, the group of instructions comprising the identifiers 1, 2, 3 and 4 must be processed before the group of instructions comprising the identifiers 5 and 6 whereas the instructions linked to the identifiers 1, 2, 3 and 4 are advantageously processed in parallel.

Such a representation is easy to understand for a user who may thus modify it in order to adapt it if required.

In an embodiment, a sequence of instructions so generated may then be executed. Advantageously, the actions concerned by the instructions are unitary (each instruction only concerns one component) and atomic (obtaining an indication of the result of executing the instruction) in order to verify the execution of the sequence of instructions.

Atomicity may in particular be obtained by receiving a notification of instruction execution of OK type if the instruction was correctly executed, NOK if the instruction was not correctly executed or WARNING if the execution of the instruction may lead to a perturbation of components of the cluster (for example the stopping of an NFS server when a node is a client of that server). In the case of a WARNING, the execution of an instruction linked to a component dependent on the execution of that instruction having produced a WARNING may be submitted for acceptance by a user or forced by the system to have a selected mode of execution (for example forced or not).

It is thus possible to manage failures in order, for example, not to stop a cold door not all the nodes have been stopped (for example if a node refuses to stop).

Figure 7:
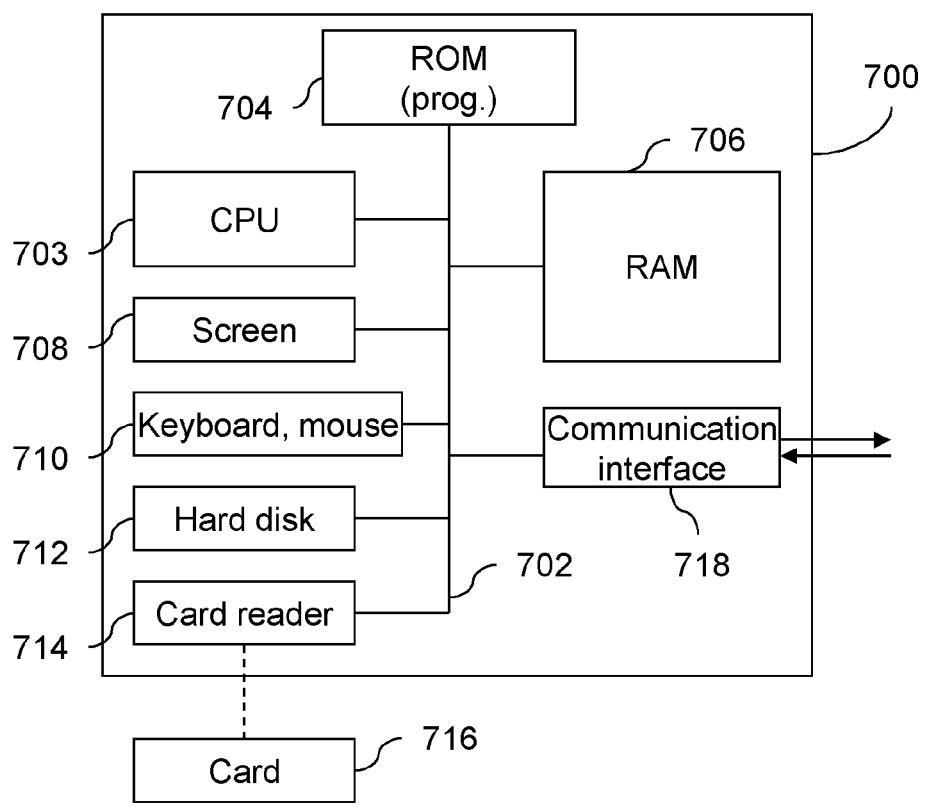
FIG. 7 is a block diagram illustrating an example of a device adapted to implement the disclosure or part of the disclosure.

A device adapted to implement the disclosure or a part of the disclosure, in particular the algorithms described with reference to FIGS. 2 and 5, is illustrated in FIG. 7. The device 700 is for example a computer of PC type (PC standing for Personal Computer).

The device 700 here comprises a communication bus 702 to which there are connected:
  a central processing unit or microprocessor 703 (or CPU, standing for Central Processing Unit);
  a read only memory 704 (ROM, acronym for Read Only Memory) able to contain the programs "frog";
  a random access memory or cache memory 706 (RAM, acronym for Random Access Memory), comprising registers adapted to record variables and parameters created and modified during the execution of the aforementioned programs; and,
  a communication interface 718 adapted to transmit and to receive data.

In an embodiment, the device 700 furthermore possesses:
a screen 708 making it possible to view data and/or serving as a graphical interface with the user who will be able to interact with the programs according to the disclosure, using a keyboard and a mouse 710 or another pointing device, such as an optical stylus, a touch screen or a remote control;
  a hard disk 135 able to contain the aforementioned programs "Prog" and data processed or to be processed according to the disclosure; and,
  a memory card reader 714 adapted to receive a memory card 716 and to read or write thereon data processed or to be processed according to the disclosure.

The communication bus allows communication and interoperability between the different elements included in the device 700 or connected to it. The representation of the bus is non-limiting and, in particular, the central processing unit may communicate instructions to any element of the device 700 directly or by means of another element of the device 700.

The executable code of each program enabling the programmable device to implement the methods according to the disclosure may be stored, for example, on the hard disk 712 or in read only memory 704.

According to a variant, the memory card 716 can contain data as well as the executable code of the aforementioned programs which, once read by the device 700, will be stored on the hard disk 712.

According to another variant, it will be possible for the executable code of the programs to be received, at least partially, via the interface 718, in order to be stored in identical manner to that described previously.

More generally, the program or programs may be loaded into one of the storage means of the device 700 before being executed.

The central processing unit 703 will control and direct the execution of the instructions or portions of software code of the program or programs according to the disclosure, these instructions being stored on the hard disk 712 or in the read-only memory 704 or in the other aforementioned storage elements. On powering up, the program or programs which are stored in a non-volatile memory, for example the hard disk 712 or the read only memory 704, are transferred into the random-access memory 706, which then contains the executable code of the program or programs according to the disclosure, as well as registers for storing the variables and parameters necessary for implementation of the disclosure.

Naturally, to satisfy specific needs, a person skilled in the art will be able to apply modifications in the preceding description.

APPENDIX

Calcul_[1-3]#islet@hw_group
CC-[1-10]#CC@rack
bullx[10-11]#mds@node
bullx[12-20]#compute@node
hwm[101-110]#bmc@hwmanager
colddoor[0-5]#coldoor@hwmanager
esw-CU[2-3]-1 #eth@switch
foo[1-5]#bar@soft
A1: Component List Example

| Rule Set | Symbolic name | Comp. type | Filter | Action | Deps Finder | Depends On | Comments |
|---|---|---|---|---|---|---|---|
| Stop | nodeOff | compute @node OR nfs @node | all | Nodectrl poweroff %comp. | find_node_ deps %comp. | nfsDown | Powering off compute and nfs nodes |
| Start | nodeOn | compute @node | %name !~ compute 12 | nodectrl poweron %comp. | find_ nodeon_ deps %name | Colddoor Start | Power on cold door before nodes |

-continued

| Rule Set | Symbolic name | Comp. type | Filter | Action | Deps Finder | Depends On | Comments |
|---|---|---|---|---|---|---|---|
| Stop | colddoorOff | colddoor @hw | all | Bsm_power off %comp. | find_ colddoor Off_dep %comp. | nodeOff | Power off nodes before a cold door |
| ... | ... | ... | ... | ... | ... | ... | ... |
| Stop | daOff | all@da | Bash -c '[[ %comp. =.* ]]' | da_admin poweroff \ %comp. | find_da_ deps %comp. | ioServer Off | Powering off disk arrays requires their clients to be powered off first |
| Stop | nfsDown | nfsd@soft | all | ssh %comp. /etc/init.d/nfs stop | Find_nfs client %comp. | unmount NFS | Stopping NFS daemons: take care of clients |
| Stop | unmountNFS | unmount NFS@soft | all | Warning : nfs mounted ! | none | none | Display a warning message for each client |

A2: Example of Dependency Rules

```
<seq>
    <par>
        <action component_set="c1#unmountNFS@soft" id="1">
            echo "WARNING : nfs mounted";
        </action>
        <action component_set="nfs1#unmountNFS@soft" id="2">
            echo "WARNING : nfs mounted";
        </action>
        <action component_set="nfs2#unmountNFS@soft" id="3">
            echo "WARNING : nfs mounted";
        </action>
        < action component_set="c1#compute@node" id="4">
            nodectrl poweroff c1;
        </action>
    </par>
    <par>
        <action component_set="nfs1#nfsd@soft" id="5">
            ssh nfs1 /etc/init.d/nfs stop
        </action>
        <action component_set="nfs2#nfsd@soft" id="6">
            ssh nfs2 /etc/init.d/nfs stop
        </action>
    </par>
    <par>
        <action component_set="nfs1#nfs@node" id="7">
            nodectrl poweroff nfs1
        </action>
        <action component_set="nfs2#nfs@node" id="8">
            nodectrl poweroff nfs2
        </action>
    </par>
    <action component_set="cd0#coldoor@hw" id="9">
        nodectrl poweroff cd0
    </action>
</seq>
```

A3: Example of an XML File Representing a Sequence of Instructions
16486773v1:exb

What is claimed is:

1. A computer method for processing at least one command concerning at least one component of a cluster, the cluster comprising a plurality of components, the at least one component having a dependency link according to the at least one command with at least one other component of the plurality of components, the method comprising:
    identifying the at least one component of the plurality of components;
    identifying at least one dependency rule on the basis of the at least one command;
    generating a dependency chart on the basis of the at least one identified component, through application of the at least one dependency rule identified, the dependency chart comprising vertices representing at least one of the components and the at least one other component, an action linked to the at least one command being associated with the vertices of the dependency chart; and
    generating a sequence of instructions on the basis of the dependency chart.

2. The method of claim 1, wherein an identification function for identifying components and a dependency rule are associated with the at least one identified dependency rule, the method further comprising identifying at least the other component from the identification function, the dependency chart being generated from the at least one identified component, from the at least one other component, from the at least one identified dependency rule and from the dependency rule associated with the at least one identified dependency rule.

3. The method of claim 1, further comprising displaying information relative to the dependency chart, and generating the sequence of instructions being carried out in response to a validation of the information displayed relative to the dependency chart.

4. The method of claim 1, wherein the step of generating a dependency chart is recursive and comprises:
    creating an initial dependency chart comprising at least the at least one component;
    selecting a component in the dependency chart;
    identifying at least one component on which the selected component is dependent in view of a dependency rule; and
    modifying the dependency chart according to the selected component and the at least one identified component on which the selected component is dependent in view of a dependency rule.

5. The method of claim 4, wherein the selecting a component in the dependency chart is based on a rule chart, the rule chart being an ordered representation of the at least one identified dependency rule and dependency rules directly or indirectly associated with the at least one identified dependency rule.

6. The method of claim 1, wherein the dependency chart includes one or more levels and the generating a sequence of instructions comprises generating at least one group of instructions for each level of the one or more levels of the dependency chart.

7. The method of claim 6, wherein the sequence of instructions is generated in the form of a file of XML type, a level tag being associated with each level of the dependency chart and a group tag being associated with each group of instructions for each tag of level corresponding to a level for which there are at least two distinct groups of instructions.

8. The method of claim 1, further comprising executing the sequence of instructions.

9. The method of claim 8, further comprising displaying information relative to the sequence of instructions, the executing the sequence of instructions being carried out in response to a validation of the information displayed relative to the sequence of instructions.

10. The method of claim 8, wherein the dependency chart includes one or more levels and instructions relative to two distinct levels of the one or more levels of the dependency chart are executed sequentially and according to which chart instructions of distinct groups of instructions of the same level of the dependency chart are executed in parallel.

11. The method of claim 1, wherein the step of generating a dependency chart is recursive.

12. A non-transitory computer program product encoded with instructions adapted for directing a computer or processor to carry out a computer method for processing at least one command concerning at least one component of a cluster, when the program is executed on the computer or processor, the cluster comprising a plurality of components, the at least one component having a dependency link according to the at least one command with at least one other component of the plurality of components, the computer method comprising:
   identifying the at least one component of the plurality of components;
   identifying at least one dependency rule on the basis of the at least one command;
   generating a dependency chart on the basis of the at least one identified component, through application of the at least one dependency rule identified, the dependency chart comprising vertices representing at least one of the components and the at least one other component, an action linked to the at least one command being associated with the vertices of the dependency chart; and
   generating a sequence of instructions on the basis of the dependency chart.

13. A computer system comprising a processing unit and a non-transitory computer program product encoded with instructions for carrying out a computer method for processing at least one command concerning at least one component of a cluster, the instructions to be executed on the processing unit, the cluster comprising a plurality of components, the at least one component having a dependency link according to the at least one command with at least one other component of the plurality of components, the computer method comprising:
   identifying the at least one component of the plurality of components;
   identifying at least one dependency rule on the basis of the at least one command;
   generating a dependency chart on the basis of the at least one identified component, through application of the at least one dependency rule identified, the dependency chart comprising vertices representing at least one of the components and the at least one other component, an action linked to the at least one command being associated with the vertices of the dependency chart; and
   generating a sequence of instructions on the basis of the dependency chart.

\* \* \* \* \*